United States Patent [19]
Tucker et al.

[11] 3,935,300
[45] Jan. 27, 1976

[54] PROCESS FOR PREPARING POTASSIUM CYANATE FROM POTASSIUM HYDROXIDE AND UREA

[75] Inventors: Gerald L. Tucker; Elmer Ladelle Blanton, both of Yazoo City, Miss.

[73] Assignee: Mississippi Chemical Corporation, Yazoo City, Miss.

[22] Filed: Feb. 20, 1974

[21] Appl. No.: 444,011

[52] U.S. Cl. .............................................. 423/365
[51] Int. Cl.² .......................................... C01C 3/14
[58] Field of Search .................................. 423/365

[56] References Cited
UNITED STATES PATENTS
3,321,270   5/1967   Davis et al. ......................... 423/365

*Primary Examiner*—Earl C. Thomas
*Attorney, Agent, or Firm*—Oblon, Fisher, Spivak, McClelland & Maier

[57] ABSTRACT

Potassium cyanate is prepared by reacting from 1.75 to 2.15 moles of urea per mole of potassium hydroxide.

4 Claims, No Drawings

PROCESS FOR PREPARING POTASSIUM CYANATE FROM POTASSIUM HYDROXIDE AND UREA

BACKGROUND OF THE INVENTION

1. Field of the Invention

The present invention relates to a method of manufacturing potassium cyanate. More particularly, the present invention relates to a method for producing potassium cyanate from potassium hydroxide and urea in very high yield.

2. Description of the Prior Art

Among the reactions known for the synthesis of alkali metal cyanates is the reaction between an alkali metal compound and urea. Suitable alkali metal compounds have included the carbonate, bicarbonate, hydride, oxide, alcoholate, carbide and hydroxide compounds of the alkali metals. The reactants have been reacted either as a melt of the components or in an aqueous solution. One process (Kloepfer, U.S. Pat. No. 1,915,425) shows the production of alkali metal cyanates by the reaction of a basic alkali metal compound, such as potassium carbonate, with urea in a melt. However, it is disclosed that if an hydroxide of an alkali metal is used such as, of course, potassium hydroxide, yields of only 10 to 30% of potassium cyanate are obtained. Yields of this order are unacceptable for the commercial production of potassium cyanate.

Another procedure for the production of alkali metal cyanates involves the reaction of an alkali metal carbonate with urea in a melt, wherein the molar amounts of urea range from 2.0 to 3.0 preferably 2.3 to 3.0 per mole of alkali metal carbonate (Horst, U.S. Pat. Nos. 2,690,956 and 2,690,957). By this procedure yields of alkali metal cyanate up to 85–90 percent are obtained. However, yields of potassium cyanate even of this order still fall short of total conversion of urea and alkali compound to potassium cyanate.

In another known procedure for manufacturing alkali metal cyanates, an alkali metal hydroxide is reacted with urea in a fluidized bed reactor wherein a mole ratio of 0.8 to 1.4 moles of urea per mole of an alkali metal hydroxide is used (Davis, U.S. Pat. No. 3,321,270). However, the yields of cyanate product in this procedure, while substantial, are not more than about 95 percent.

Still another process for the production of alkali metal cyanates involves the reaction of an alkali metal carbonate or hydroxide with urea. In this reaction the quantities of urea used range only from the stoichiometric amount (mole ratio of urea to KOH of 1.0) required to react with the alkali metal compound to 10 percent in excess of that amount. However, at these relative quantities of urea to alkali metal compound, the yields of product alkali metal cyanate obtained, while substantial, are only about 90 percent. It is further disclosed that there is no advantage to be gained by using quantities of urea over 10 percent in excess of the stoichiometric amount required to react with the alkali metal compound. This statement is in direct contrast to the process of the present invention, wherein the amounts of urea relative to alkali metal base used, achieve yields of product alkali metal cyanate is in excess of 90 percent.

Another process for the preparation of alkali metal cyanates also involves the reaction of an alkali metal compound and urea. However, because very great amounts of urea are required relative to the amount of alkali metal compound, i.e., mole ratios of urea to alkali metal compound of about 6 : 1, (Barrett and Kamlet, U.S. Pat. No. 2,899,198), the process if highly inefficient in the utilization of urea.

Other known processes for the production of alkali metal cyanates include the reaction between isohydroxyurea, and an alkali metal hydroxide in a simple alcohol and the reaction between sodium and urea in a dispersion wherein N-sodiourea is first formed.

A need therefore, continues to exist for a method for producing alkali metal cyanates in high purity in yields greater than 90 percent by the direct interaction of an alkali metal hydroxide with urea.

SUMMARY OF THE INVENTION

Accordingly, one object of the present invention is to provide a process for producing potassium cyanate in yields in excess of 90 percent.

Briefly, this object and other objects of the present invention as hereinafter will become more readily apparent can be attained by a process for preparing potassium cyanate by reacting 1.75 to 2.15 moles of urea per mole of potassium hydroxide.

DESCRIPTION OF THE PREFERRED EMBODIMENTS

In the reaction of urea with potassium hydroxide under the conditions of the present invention it is critical that from 1.75 to 2.15 moles of urea be reacted per mole of potassium hydroxide. This can be seen by reference to Table 1 below in which it is shown that yields of about 90 to 100 percent of potassium cyanate product are obtained when the reaction is conducted under conditions using the above indicated ratio limitations. The table readily shows that if less than 1.75 moles of urea are used per mole of potassium hydroxide, then the yield of potassium cyanate rapidly falls below 90 percent. Similarly, if more than 2.15 moles of urea are used per mole of potassium hydroxide, the yield of potassium cyanate rapidly falls below 90 percent.

TABLE 1

Reaction of urea with potassium hydroxide to form potassium cyanate

| Mole Ratio Urea/KOH | Yield (%) KOCN |
|---|---|
| 1.0 | 32 |
| 1.5 | 69 |
| 1.75 | 89 |
| 1.90 | 100 |
| 2.0 | 96.5 |
| 2.15 | 90.0 |
| 2.5 | 75 |

The critical mole ratio requirement of urea to potassium hydroxide is all the more noteworthy in view of prior art disclosures which indicate that mole ratios of urea to potassium hydroxide of 1.75 to 2.15 : 1.0 are either unnecessary or should be avoided. DePree (U.S. Pat. No. 2,801,154) specifically states that in the reaction of urea with alkali metal hydroxide, no advantage is gained when the quantity of urea used is significantly beyond 10 percent in excess of the stoichiometric amount required to react with the alkali metal hydroxide. Further, Davis (U.S. Pat. No. 3,321,270) states that from about 0.8 to 1.4 moles of urea per mole of alkali metal hydroxide should be reacted to attain the most practical operation for the reaction.

In the preparation of potassium cyanate from urea and potassium hydroxide the starting materials are heated to temperatures up to 240°C. Normally the reactants are combined and then heated. When a temperature of about 180°C is reached, the melt resolidifies. In another procedure, solid potassium hydroxide is added to molten urea. As in the previous instance, when a temperature of about 180°C is reached, the reaction mixture resolidifies. It is also possible to mix the reactants in the molten form and then continue heating to higher temperatures. It is not recommended, however, to mix the reactants as an aqueous solution, because the reaction would require an inordinately long time. Once the starting materials have been mixed, the materials can be heated to the desired temperature. The end of the reaction is signaled when reaction by products cease to be evolved. During the process of heating the reactants, the pressure used is not critical. Usually, however, the pressure used is atmospheric.

In the preferred embodiment of the process, urea and potassium hydroxide are combined in the required mole ratio and heated. The mixture melts as it is heated, and as the temperature reaches about 180°C, it resolidifies. If this temperature is maintained for the duration of the reaction, the mixture requires about 24 hours for completion. The reaction can be conducted at temperatures as low as 100°C. Preferably, the mixture is heated to completion at a temperature of about 240°C, whereby the end of the reaction is indicated when reaction by products are no longer evolved. At temperatures of this order, the reaction is normally complete in 3 to 5 hours. The 3-5 hour reaction completion time is based upon the reactants remaining undisturbed. If the initial reaction mass (which resolidifies) was finely divided, a shorter reaction time would result. It is also feasible to mix the components, and heat the mixture to a temperature above the fusion temperature of potassium cyanate ranging from 325° to 360°C. The reaction can be represented by the following equation:

$$KOH + 2\ OC(NH_2)_2 \rightarrow (KOCN)_x + 3\ NH_3 + CO_2$$

wherein $x$ ranges from 1-3.

KOCN   potassium cyanate
KNCO   potassium isocyanate

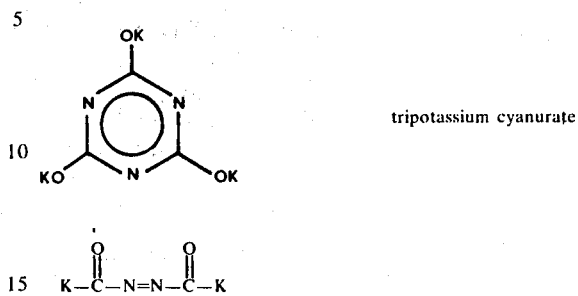

tripotassium cyanurate

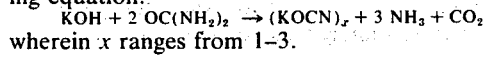

The data gathered from various tests have confirmed that the compound produced by the reaction of urea with potassium hydroxide is however, potassium cyanate. This data is shown in the Examples below.

Alkali metal cyanates such as of course, potassium cyanate are useful as raw materials for chamical syntheses, as herbicides and in the hardening of steels.

Having generally described this invention, a further understanding can be obtained by reference to certain specific examples which are provided herein for purpose of illustration only are not intended to be limiting unless otherwise specified.

EXAMPLES 1 - 17

Table II shows the relative amounts of urea and potassium hydroxide or potassium carbonate which are reacted in various exemplary preparations of potassium cyanate. Potassium cyanate was prepared by mixing the relative amounts of urea and potassium hydroxide or potassium carbonate in a beaker, and then heating the mixture on a hot plate until the mixture was molten at about 100°C. The reaction mixture was further heated until the reaction mixture solidified at approximately 180°C. The mixture was then transferred to a 240°C oven where the mixture was heated until no further weight loss was observed.

TABLE II

TESTS WITH UREA AND POTASSIUM HYDROXIDE OR CARBONATE

| Example | Alkali | Molar Ratio Urea/Alkali | Theor. Grams of KOCN | Grams (KOCN)$_x$ from Test | %Purity by DSC | Actual Grams KOCN (100%) | % Yield |
|---|---|---|---|---|---|---|---|
| 1 | K$_2$CO$_3$ | 2.0 | 33.8 | 34.5 | 75.5 | 26.0 | 76.9 |
| 2 | K$_2$CO$_3$ | 2.0 | 81.1 | 100.3 | 77.7 | 77.9 | 76.2 |
| 3 | KOH | 1.1 | 36.4 | 34.8 | 45.5 | 15.8 | 43.4 |
| 4 | K$_2$CO$_3$.1½ H$_2$O | 2.0 | 32.8 | 30.4 | 61.3 | 18.6 | 56.6 |
| 5 | KOH | 2.3 | 35.1 | 41.2 | 70.7 | 29.1 | 82.9 |
| 6 | KOH | 1.4 | 58.6 | 56.2 | 64 | 35.9 | 61.3 |
| 7 | KOH | 1.2 | 66.1 | 61 | 45.8 | 27.9 | 42.3 |
| 8 | KOH | 1.1 | 72.1 | 67.7 | 33.9 | 23.0 | 31.8 |
| 9 | KOH | 1.5 | 53.9 | 53.4 | 78.2 | 41.8 | 77.5 |
| 10 | KOH | 1.9 | 43.3 | 45.3 | 96.8 | 43.8 | 101.0 |
| 11 | KOH | 2.8 | 29.0 | 39.7 | 57.8 | 22.9 | 79.2 |
| 12 | KOH | 3.7 | 26.8 | 38 | 22.2 | 8.5 | 31.7 |
| 13 | KOH | 0.75 | 108 | 99.6 | 15.0 | 14.9 | 15.0 |
| 14 | KOH | 1.7 | 48.2 | 49 | 86.2 | 42.2 | 87.6 |
| 15 | K$_2$CO$_3$ | 4.0 | 40.4 | 47.9 | 58.8 | 28.2 | 69.8 |
| 16 | K$_2$CO$_3$ | 3.0 | 54.1 | 55.1 | 90.0 | 49.6 | 91.5 |
| 17 | KOH | 1.9 | 216 | 229 | 96.5 | 221 | 102.0 |

The highest purity compounds produced by the reaction of urea with potassium hydroxide have an empirical formula of (KOCN)$_x$. The highest purity products are those which have the highest energy melt peaks in the DSC (Differential Scanning Calorimetry) spectrum. The following structures have been postulated as compatable with the empirical formula of (KOCN)$_x$:

The results shown in Table II indicate that the highest yields of potassium cyanate are obtained at urea/potassium hydroxide molar ratios of 1.75 to 2.15.

EXAMPLE 18

Further insight into the completeness of the reaction when operating in the preferred mole ratio range of urea to potassium hydroxide can be gained by reference to Table III below. Table III shows that the rate of conversion of urea and potassium hydroxide to potassium cyanate is 100 percent at a time just under 4 hours for a mole ratio of urea to KOH of 1.9.

TABLE III

Conversion rate of urea and potassium hydroxide to potassium cyanate*

| Time (hours) | Conversion (%) | |
|---|---|---|
| 0 | 0 | } 100° – 150°C |
| 1 | 40 | |
| 2 | 72 | } 240°C |
| 3 | 94.5 | |
| 3.75 | 100 | |

*Mole ratio of Urea/KOH = 1.9.

In order to establish the structure of $(KOCN)_x$ various types of comparative tests were conducted on authentic samples of potassium cyanate (KOCN) and the urea-potassium product $(KOCN)_x$ prepared by the reaction of urea with potassium hydroxide. The table below compares various physical properties of $(KOCN)_x$ and authentic KOCN.

| Solubility In | $(KOCN)_x$ | KOCN |
|---|---|---|
| a) Water at 78°F(wt.%) | 36.9 | 38.6 |
| b) Ethanol | insol | insol |
| c) Acetone | " | " |
| d) p-Xylene | " | " |
| pH of a 10% solution | 11.3 | 9.6 |
| Absolute Density at 78°F | 2.03 | 2.02 |

Inspection of the data indicated that the $(KOCN)_x$ product and potassium cyanate are the same compound.

Further confirmation of the identify of $(KOCN)_x$ as KOCN was obtained by comparison of the DSC spectra of $(KOCN)_x$ and KOCN as well as the X-ray diffraction spectra thereof. DSC scans of $(KOCN)_x$ and KOCN revealed the same melt peak at 315°C. The X-ray diffractograms of reagent grade KOCN and $(KOCN)_x$ also indicated that the two compounds were the same.

Further investigations into the properties of $(KOCN)_x$ were conducted through a study of the crystallization properties of $(KOCN)_x$ from water. This study was conducted to ascertain whether or not $(KOCN)_x$ could be further purified by recrystallization from water as well as to determine whether or not $(KOCN)_x$ is hydrolyzed to another form. It had been found that aqueous solutions of $(KOCN)_x$ developed a strong ammonical odor which indicates that $(KOCN)_x$ hydrolyzes. Samples of $(KOCN)_x$ and authentic KOCN were recrystallized at 194°F. Under these conditions all free ammonia would be evolved. Further, the reagent grade KOCN used was treated in the same manner as $(KOCN)_x$. As shown below DSC Scans and X-ray Diffractograms were obtained from both recrystallized compounds.

a. DSC Scans-Both recrystallized $(KOCN)_x$ and KOCN had broad decomposition peaks in the range of 150° – 220°C. In addition, the amount of weight loss of the samples during the scans was the same for both within experimental accuracy: 22.6% for $(KOCN)_x$ and 21.8% for KOCN.

b. X-ray Diffractograms - X-ray scans on samples of recystallized $(KOCN)_x$ and recrystallized KOCN indicate that the recrystallized products are principally $K_4H_2(CO_3)_3 \cdot 1½H_2O$ along with the unidentified hydrolysis products. $K_4H_2(CO_3)_3 \cdot 1½H_2O$ is a complex salt of 1 mole of $K_2CO_3 \cdot 1½H_2O$ and 2 moles of $KHCO_3$. The reaction that occurs when potassium cyanate undergoes hydrolysis is as follows:

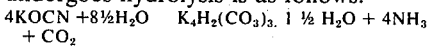

Having now fully described this invention, it will be apparent to one of ordinary skill in the art that many changes and modifications can be made thereto without departing from the spirit or scope of the invention as set forth herein.

What is claimed as new and intended to be covered by Letters Patent of the United States is:

1. In a process for preparing potassium cyanate by the melt reaction of urea with potassium hydroxide and recovering the resulting potassium cyanate, the improvement which comprises:

mixing solid urea and solid potassium hydroxide in a mole ratio of 1.75 to 2.15 : 1.0; and heating said mixture until it melts and resolidifies to 180° – 240°C and reaction byproducts are no longer evolved.

2. The process of claim 1, wherein said urea and said potassium hydroxide are mixed in a mole ratio of 1.9 : 1.

3. The process of claim 2, wherein the mixture is heated for 3.75 hours at 240°C.

4. The process of claim 1, wherein the mixture of said urea and said potassium hydroxide are heated until solidifed at 180°C and said solidified mixture then heated at 240°C until no further weight loss occurs.

* * * * *